(12) United States Patent
Kim et al.

(10) Patent No.: US 8,571,128 B2
(45) Date of Patent: Oct. 29, 2013

(54) METHOD TO GENERATE BEAMFORMING VECTOR AND PROVIDE THE INFORMATION FOR GENERATING BEAMFORMING VECTOR

(75) Inventors: Ji Hyung Kim, Daejeon (KR); Wooram Shin, Daejeon (KR); Dong Seung Kwon, Daejeon (KR); Choongil Yeh, Daejeon (KR); Een Kee Hong, Seongnam-si (KR)

(73) Assignees: Electronics and Telecommunications Research Institute, Daejeon (KR); Industry Academic Cooperation Foundation of Kyunghee University, Yongin-Si (KR)

( * ) Notice: Subject to any disclaimer, the term of this patent is extended or adjusted under 35 U.S.C. 154(b) by 45 days.

(21) Appl. No.: 13/058,939

(22) PCT Filed: Aug. 14, 2009

(86) PCT No.: PCT/KR2009/004560
§ 371 (c)(1),
(2), (4) Date: Feb. 14, 2011

(87) PCT Pub. No.: WO2010/019015
PCT Pub. Date: Feb. 18, 2010

(65) Prior Publication Data
US 2011/0150132 A1    Jun. 23, 2011

(30) Foreign Application Priority Data

Aug. 14, 2008 (KR) .................. 10-2008-0079815
Aug. 14, 2009 (KR) .................. 10-2009-0075136

(51) Int. Cl.
*H04B 7/02* (2006.01)
*H04L 1/02* (2006.01)

(52) U.S. Cl.
USPC ............................. 375/267; 375/261

(58) Field of Classification Search
USPC ............................................. 375/267
See application file for complete search history.

(56) References Cited

U.S. PATENT DOCUMENTS

| 7,096,041 B2 | 8/2006 | Brunner et al. |
| 7,116,723 B2 | 10/2006 | Kim et al. |
| 7,881,395 B2 * | 2/2011 | Lee et al. ............... 375/267 |
| 2005/0043031 A1 | 2/2005 | Cho et al. |

(Continued)

FOREIGN PATENT DOCUMENTS

| CN | 101094022 A | 12/2007 |
| CN | 101141166 A | 3/2008 |

(Continued)

OTHER PUBLICATIONS

Edward A. Jorswieck, et al., Complete Characterization of the Pareto Boundary for the MISO Interference Channel, ICASSP 2008 (pp. 5292-5296).

(Continued)

*Primary Examiner* — Erin File
(74) *Attorney, Agent, or Firm* — Staas & Halsey LLP

(57) ABSTRACT

A method to generate a beamforming vector by a terminal includes receiving information on a first precoding matrix and a second precoding matrix from a serving base station; and generating a beamforming vector by linearly combining the first precoding matrix and the second precoding matrix.

14 Claims, 3 Drawing Sheets

(56) References Cited

U.S. PATENT DOCUMENTS

| | | | |
|---|---|---|---|
| 2006/0268623 | A1 | 11/2006 | Chae et al. |
| 2006/0281462 | A1 | 12/2006 | Kim et al. |
| 2007/0064632 | A1 | 3/2007 | Zheng et al. |
| 2007/0165738 | A1 | 7/2007 | Barriac et al. |
| 2007/0291700 | A1 | 12/2007 | Zhang et al. |
| 2009/0286482 | A1* | 11/2009 | Gorokhov et al. .......... 455/63.1 |
| 2011/0194650 | A1* | 8/2011 | Lee et al. .................. 375/316 |
| 2011/0199926 | A1* | 8/2011 | Zheng et al. ................ 370/252 |

FOREIGN PATENT DOCUMENTS

| | | |
|---|---|---|
| CN | 101232317 A | 7/2008 |
| EP | 1944933 A2 | 7/2008 |
| JP | 2006-67623 | 3/2006 |
| JP | 2006-352883 | 12/2006 |
| JP | 2008-61265 | 3/2008 |
| KR | 2002-0008301 | 1/2002 |
| KR | 10-2005-0020576 | 3/2005 |
| KR | 10-200809959672 | 6/2008 |
| WO | 2006/055719 A2 | 5/2006 |
| WO | 2007/051192 A2 | 5/2007 |
| WO | WO 2007/105928 A1 | 9/2007 |
| WO | 2007/139325 | 12/2007 |
| WO | 2008/052191 | 5/2008 |
| WO | 2008/054178 | 5/2008 |

OTHER PUBLICATIONS

Jihyung Kim, et al, Interference Mitigation for Uplink, IEEE C802.16m-08/667r1, Jul. 14, 2008 (pp. 1-9).
Jihyung Kim, et al, Proposed Text of Interference Mitigation for the IEEE 802.16m Amendment Working Document, IEEE 802.16 Broadband Wireless Access Working Group http://ieee802.org/16, May 4, 2009 (pp. 1-7).
Jihyung Kim, et al., Interference Mitigation DG Text Proposal Draft , IEEE 802.16 Broadband Wireless Access Working Group <http://ieee802.org/16>, May 26, 2009 (pp. 1-4).
Texas Instruments, "Uplink SU-MIMO for E-UTRA" 3 GPP TSG RAN WG1, R1-082496 [online], Jun. 30, 2008, retrieved on May 16, 2011, sections 1-3, 6.
Samsung Electronics: "Multi-cell MIMO Schemes for IEEE 802.16m", IEEE 802.16 Broadband Wireless Access Working Group, IEEE C 802.16m-08/632 [online] Jul. 7, 2008, retrieved May 16, 2011, sections 1-4, 6, 7.
ETRI: "Proposed Text of Interference Mitigation for the IEEE 802.16m Amendment Working Document" IEEE 802.16 Broadband Wireless Access Working Group, IEEE C802.16m-09/1030 [online] Apr. 27, 2009, retrieved May 16, 2011, sections 1-6.
International Search Report issued in corresponding International Patent Application PCT/KR2009/004560.
Panasonic, "Precoding consideration on LTE-Adv uplink", 3GPP TSG RAN WG1 Meeting #54, Aug. 2008, pp. 1-6.
Mai Vu et al., "MIMO Wireless Linear Precoding", IEEE Signal Processing Magazine, Sep. 2007, pp. 86-105.

* cited by examiner

METHOD TO GENERATE BEAMFORMING VECTOR AND PROVIDE THE INFORMATION FOR GENERATING BEAMFORMING VECTOR

CROSS REFERENCE TO RELATED APPLICATIONS

This application claims the benefit of International Application No. PCT/KR2009/004560, filed Aug. 14, 2009, and claims the benefit of Korean Application No. 10-2008-0079815, filed Aug. 14, 2008, and Korean Application No. 10-2009-0075136, filed Aug. 14, 2009, the disclosures of all of which are incorporated herein by reference.

TECHNICAL FIELD

The present invention relates to a method to generate a beamforming vector.

BACKGROUND ART

A multi input multi output (MIMO) communication system, which is an antenna system that can perform a multi input and output, is a technology that can transmit data to several route by increasing an antenna of a base station and a terminal to two or more and detect signals received from a receiving end to each route to reduce interference and reduce each transmission speed.

The terminal using a multi antenna can control a transmission direction of data using a beamforming vector. However, since the beamforming vector can cause the interference between neighboring cells, a need exists for a method to generate a beamforming vector in consideration of the interference between the neighboring cells.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a method to generate a beamforming vector in consideration of interference between neighboring cells and a method to provide information for generating a beamforming vector.

Solution to Problem

Another embodiment of the present invention provides a method to provide information for generating a beamforming vector from a serving base station to a terminal, including: instructing a combination of the precoding matrices to the terminal; and transmitting information on the first precoding matrix and the second precoding matrix to the terminal, wherein the first precoding matrix is a precoding matrix that maximizes transmission power from the terminal to a serving base station and the second precoding matrix is a precoding matrix that minimizes interference power from the terminal to a neighboring base station.

Yet another embodiment of the present invention provides a method to generate a beamforming vector by a terminal, including: selecting a first precoding matrix and a second precoding matrix; and generating a beamforming vector by linearly combining the first precoding matrix and the second precoding matrix, wherein the first precoding matrix is a precoding matrix that maximizes SINR for a channel between the terminal and a serving base station and the second precoding matrix is a previous coding for nulling the channel between the terminal and a neighboring base station.

Advantageous Effects of Invention

The exemplary embodiments of the present invention can provide the method to generate a beamforming vector in consideration of the interference between the neighboring cells and the method to provide information for generating a beaming forming vector.

BEST MODE FOR CARRYING OUT THE INVENTION

Figure 1:
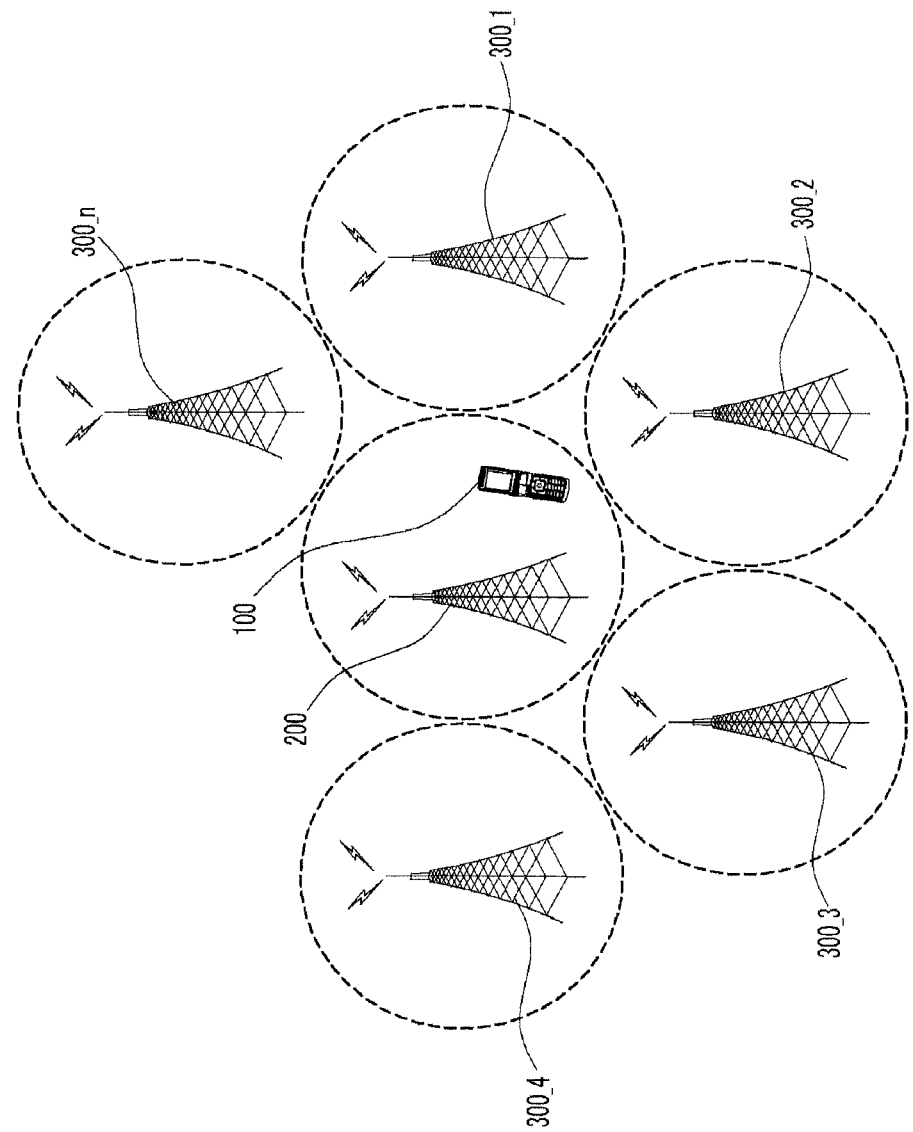
FIG. 1 is a diagram conceptually showing a communication system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, unless explicitly described to the contrary, the word "comprise" and variations such as "comprises" or "comprising", will be understood to imply the inclusion of stated elements but not the exclusion of any other elements.

Hereinafter, a method to generate a beamforming vector and a method to provide information for generating a beamforming vector according to an exemplary embodiment of the present invention will be described with reference to the accompanying drawings.

Figure 2:
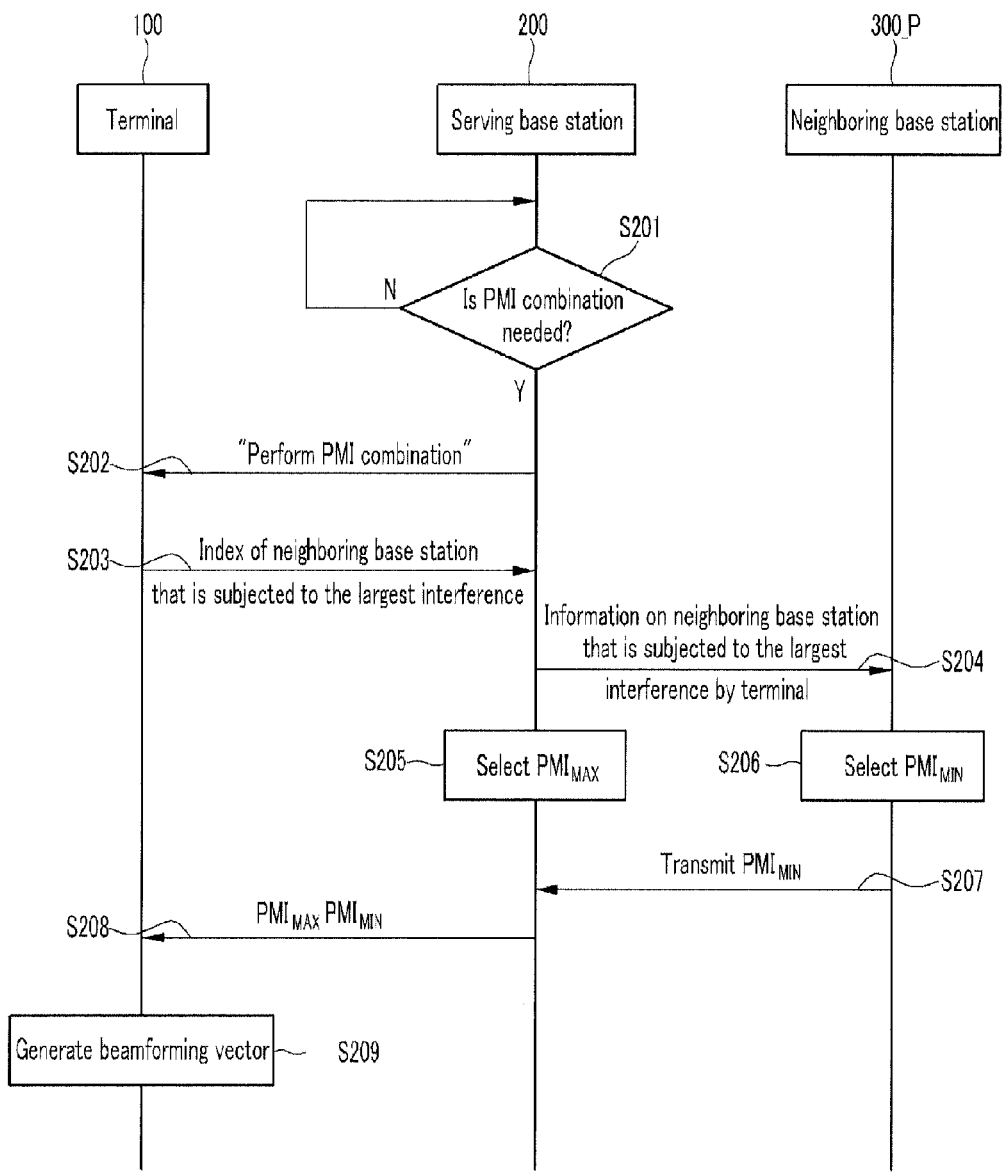
FIG. 2 is a flowchart showing a method to determine a beamforming vector according to an exemplary embodiment of the present invention.

FIG. 1 is a diagram conceptually showing a communication system according to an exemplary embodiment of the present invention and FIG. 2 is a flowchart showing a method to determine a beamforming vector according to an exemplary embodiment of the present invention.

Referring to FIGS. 1 and 2, the communication system according to an exemplary embodiment of the present invention includes a terminal 100, a serving base station 200, and a plurality of neighboring base stations 300_1, 300_2, . . . , 300_n.

The serving base station 200 measures a channel based on a signal received from a terminal 100 and determines whether or not the terminal 100 should perform a precoding matrix index (PMI) combination (hereinafter, referred to as "PMI combination") based on the channel measurement (S201).

Herein, the PMI combination means that the terminal 100 combines some of a plurality of precoding matrices included in a codebook ($\{W_j\}$) to generate a beamforming vector.

The serving base station 200 can use the interference amount in order to determine whether or not to perform the PMI combination. That is, when the interference amount is a predetermined reference value or more, the serving base station 200 determines that the effect of the interference by the terminal 100 is large and thus should perform the PMI combination.

As the interference amount, interference over thermal (loT), a signal to interference plus noise ratio (SINR), a carrier to interface ratio (CINR), etc. can be used.

If it is determined that the PMI combination should be performed, the serving base station 200 transmits a message indication the performance of the PMI combination to the terminal 100 (S202). As the message, a map management message can be used.

The terminal 100 receiving the message determines a neighboring base station that is subject to the largest interference by the terminal 100, among the plurality of neighboring base stations 300_1, 300_2, 300_n.

The neighboring base station that is subject to the largest interference by the terminal 100 can be determined by various manners. For example, it can be determined by a manner such as Equation 1 using received signal strength indication (RSSI).

$$P = \operatorname*{argmax}_{p \neq q}(RSSI_{p,i} - RSSI_{q,i}) \qquad \text{[Equation 1]}$$

In Equation 1, p indicates indices of the neighboring base stations 300_1, 300_2, ..., 300_n, q indicates an index of the serving base station 200, and i indicates an index of the terminal 100. $RSSI_{p,i}$ indicates the received signal strength indication from the neighboring base stations having the index of p to the terminal having the index of i, $RSSI_{q,i}$ indicates the received signal strength indication from the serving base station having the index of q to the terminal having the index of i, and the terminal 100 determines the neighboring base station where a value subtracting $RSSI_{q,i}$ from $RSSI_{p,i}$ by Equation 1 is maximized as the neighboring base station 300_P that is subject to the largest interference by the terminal 100.

Thereafter, the terminal 100 transmits information corresponding to the index P of the neighboring base station 300_P that is subject to the largest interference determined by Equation 1 to the serving base station 200 (S203) and the serving base station 200 transmits a message indicating that the neighboring base station 300_P is the neighboring base station that is subject to the largest interference by the terminal 100 to the neighboring base station 300_P (S204).

Thereafter, the serving base station 200 measures a channel ($H_S$) between the terminal 100 and the serving base station 200 using a signal received from the terminal 100, for example, a sounding signal and selects a precoding matrix index ($PMI_{Max}$) that maximizes transmission power to from the terminal 100 to the serving base station 200 using Equation 2 (S205). The matrix to maximize the SINR for the channel between the terminal 100 and the serving base station 200 may be one example of a matrix that maximizes the transmission power from the terminal 100 to the serving base station 200.

To this end, the serving base station 200 selects, as $PMI_{Max}$, the index for the precoding matrix that maximizes a size of a product $$(W_j \cdot H_S)$$

with a channel matrix ($H_S$) between the terminal 100 and the serving base station 200 among the plurality of precoding matrices included in the codebook ($\{W_j\}$). In this case, the size of $$W_j \cdot H_S$$

matrix can be calculated as a square of norm of $$W_j \cdot H_S$$

matrix according to Equation 2.

$$PMI_{Max} = \max_j \|(W_j \cdot H_S)\|^2 \qquad \text{[Equation 2]}$$

In Equation 2, $W_j$ means each of the plurality of precoding matrices included in the codebook $\{W_j\}$.

Meanwhile, the neighboring base station 300_P determined as the neighboring base station that is subject to the largest interference by the terminal 100 according to Equation 1 measures the channel ($H_I$) between the terminal 100 and the neighboring base station 300_P using a signal received from the terminal 100, for example, the sounding signal and selects the precoding matrix index ($PMI_{Min}$) that minimizes the effect of the interference from the terminal 100 to the neighboring base station 300_P using Equation 3 (S206). As one example, there may be the precoding matrix that minimizes the effect of the interference from the terminal 100 to the neighboring base station 300_P using a matrix for nulling the channel between the terminal 100 and the neighboring base station 300_P.

To this end, the neighboring base station 300_P selects, as $PMI_{Min}$, the index for the precoding matrix that minimizes a size of a product $$(W_j \cdot H_I)$$

with a channel matrix ($H_I$) between the terminal 100 and the neighboring base station 300_P among the plurality of precoding matrices included in the codebook ($\{W_j\}$). In this case, the size of $$W_j \cdot H_I$$

matrix can be calculated as a square of norm of $$W_j \cdot H_I$$

matrix according to Equation 3.

$$PMI_{Min} = \min_j \|(W_j \cdot H_I)\|^2 \qquad \text{[Equation 3]}$$

The neighboring base station 300_P selects the precoding matrix index ($PMI_{Min}$) that minimizes the product with the channel matrix ($H_I$) from the terminal 100 to the neighboring base station 300_P using Equation 3, among the plurality of precoding matrices included in the codebook ($\{W_j\}$).

Thereafter, the neighboring base station 300_P transmits the selected $PMI_{Min}$ to the serving base station 200 (S207) and the serving base station 200 receiving PMI transmits the $PMI_{Max}$ and $PMI_{Min}$ to the terminal 100 (S208).

The terminal 100 receiving the $PMI_{Max}$ and $PMI_{Min}$ linearly combines the precoding matrices corresponding to each of the $PMI_{Max}$ and $PMI_{Min}$ using Equation 4 to generate the beamforming vector W (S209).

$$W = \frac{\alpha \cdot W_{PMI_{Max}} + (1-\alpha) \cdot W_{PMI_{Min}}}{\|\alpha \cdot W_{PMI_{Max}} + (1-\alpha) \cdot W_{PMI_{Min}}\|}, \quad 0 \le \alpha \le 1 \quad \text{[Equation 4]}$$

In Equation 4, α, which is a coefficient that indicates the combination ratio of $W_{PMI_{Max}}$ that is the precoding matrix for $PMI_{Max}$ and $W_{PMI_{Min}}$ that is the precoding matrix for $PMI_{Min}$, is determined based on a range that includes a value subtracting the received signal strength indication ($RSSI_{q,i}$) from the serving base station having the index of q to the terminal having the index of i from the received signal strength indication ($RSSI_{P,i}$) from the neighboring base station having the index of P to the terminal having the index of i according to Equation 5.

If $(RSSI_{P,i} - RSSI_{q,i} < T1)$, $\alpha = K1$

If $(T1 \le RSSI_{P,i} - RSSI_{q,i} \le T2)$, $\alpha = K2$

If $(T2 < RSSI_{P,i} - RSSI_{q,i})$, $\alpha = K3$

In Equation 5, T1, T2, K1, K2 and K3 are predetermined values by an experiment.

Referring to Equation 5, the terminal 100 is positioned at the central part of the serving base station 200, such that the combination ratio α becomes K1 when a value subtracting the received signal strength indication ($RSSI_{q,i}$) from the serving base station having the index of q to the terminal having the index of i from the received signal strength indication ($RSSI_{P,i}$) from the neighboring base station having the index of P to the terminal having the index of i is smaller than T1.

On the other hand, the terminal 100 is positioned at a boundary portion of the serving base station 200 and the neighboring base station 300_P, such that the combination ratio α becomes K3 when a value subtracting the received signal strength indication ($RSSI_{q,i}$) from the serving base station having the index of q to the terminal having the index of i from the received signal strength indication ($RSSI_{P,i}$) from the neighboring base station having the index of P to the terminal having the index of i is larger than T2.

Further, the combination ratio α becomes K2 when a value subtracting the received signal strength indication ($RSSI_{q,i}$) from the serving base station having the index of q to the terminal having the index of i from the received signal strength indication ($RSSI_{P,i}$) from the neighboring base station having the index of P to the terminal having the index of i is equal to or larger than T1 and smaller than T2.

Figure 3:
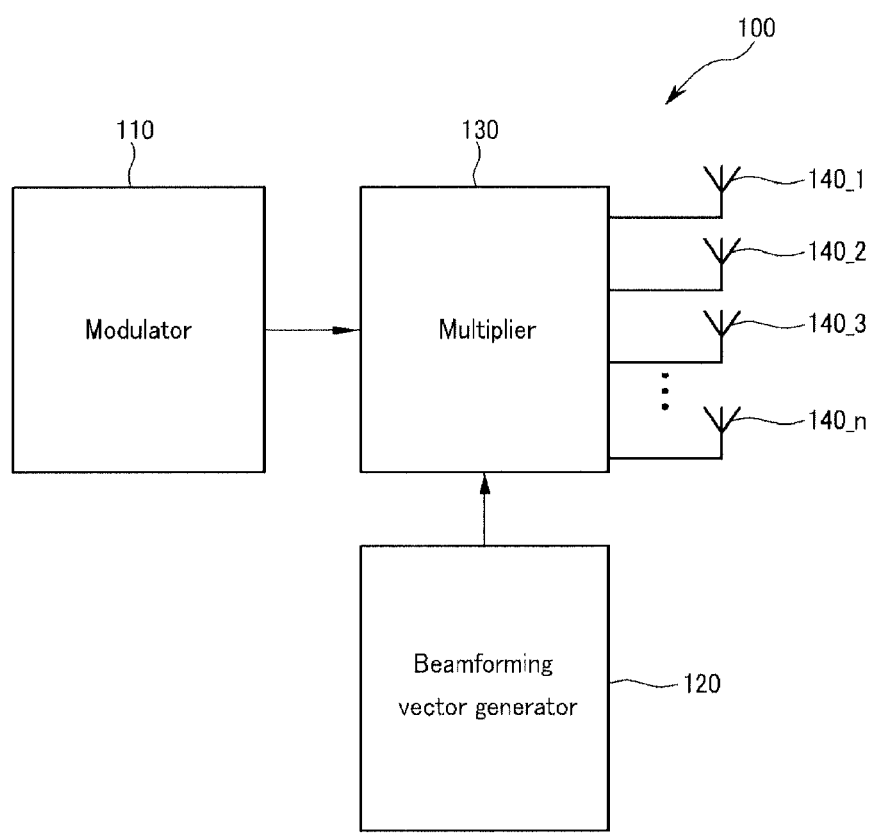
FIG. 3 is a diagram conceptually showing a terminal 100 according to an exemplary embodiment of the present invention.

FIG. 3 is a diagram conceptually showing a terminal 100 according to an exemplary embodiment of the present invention. Referring to FIG. 3, the terminal 100 according to an exemplary includes a modulator 110, a beamforming vector generator 120, a multiplier 130, and a plurality of antennas 140_1, 140_2, ..., 140_n.

The modulator 110 modulates input data and outputs symbols.

The beamforming vector generator 120 determines the neighboring base station that is subject to the largest interference by the terminal 100, among the plurality of neighboring base stations 300_1, 300_2, 300_n by using Equation 1 and transmits the determined neighboring base station 300_P to the serving base station 200.

In addition, the beamforming vector is generated based on the $PMI_{Max}$ and $PMI_{Min}$ received from the serving base station 200 using Equations 4 and 5.

The multiplier 130 applies the beamforming vector generated from the beamforming vector generator 120 to the symbols output from the modulator 110 and transmits it through the plurality of antennas 140_1, 140_2, ..., 140_n.

Although the exemplary embodiment of the present invention described that the terminal 100 receives the $PMI_{Max}$ and $PMI_{Min}$ from the serving base station 200, the terminal 100 may directly select the $PMI_{Max}$ and $PMI_{Min}$. In other words, the terminal can select the index of the precoding matrix as $PMI_{Max}$ in order to maximize the SINR for the channel between the terminal 100 and the serving base station 200 and select, as $PMI_{Min}$, the index of the precoding matrix for nulling the channel between the terminal 100 and the neighboring base station.

In addition, although Equations 4 and 5 describe that the combination ration of two precoding matrices is determined according to the received signal strength indication, the combination ratio may be determined according to the interference amount, for example, the IoT level, unlike this. For example, when the IoT level of the neighboring base station is high, that is, when the neighboring base station is largely affected, the ratio of the matrix for nulling increases and when the IoT level is low, the ratio of the matrix is high in order to maximize the SINR for the channel between the terminal 100 and the serving base station 200.

According to another embodiment, the terminal 100 can generate the beamforming vector based on the interference amount, for example, the IoT level.

The neighboring base stations 300_1, 300_2, 300_n measure the IoT level for each subchannel or any region according to a method for allocating the subchannel in the serving base station 200 and transmits the subchannel index or the region index having the high IoT level to the serving base station 200.

Thereafter, the serving base station 200 transmits a message indicating that the IoT level is high to the terminal using the subchannel index or region index having the high IoT level received from the neighboring base stations 300_1, 300_2, ..., 300_n.

When the terminal using the subchannel or region having the high IoT level generates the beforming vector suitable for a current frame, the previously used beamforming vector is removed.

The above-mentioned exemplary embodiments of the present invention are not embodied only by a apparatus and method. Alternatively, the above-mentioned exemplary embodiments may be embodied by a program performing functions, which correspond to the configuration of the exemplary embodiments of the present invention, or a recording medium on which the program is recorded. These embodiments can be easily devised from the description of the above-mentioned exemplary embodiments by those skilled in the art to which the present invention pertains.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method to generate a beamforming vector by a terminal, the method comprising: receiving information identifying a first precoding matrix and information identifying a second precoding matrix from a serving base station; and generating a beamforming vector by linearly combining the first precoding matrix and the second precoding matrix, wherein the first precoding matrix is a precoding matrix that maximizes transmission power to the serving base station and the second precoding matrix is a precoding matrix that minimizes interference to a neighboring base station.

2. The method of claim 1, wherein:
the first precoding matrix is a precoding matrix that maximizes a norm of a product of a channel matrix between the terminal and the serving base station and each of a plurality of precoding matrices included in a code book.

3. The method of claim 1, wherein the information on the second precoding matrix is provided from the neighboring base station to the serving base station.

4. The method of claim 1, wherein the information on the first precoding matrix and the information on the second precoding matrix are an index of the first precoding matrix and an index of the second precoding matrix in a code book including the plurality of precoding matrices, respectively.

5. A method to provide information for generating a beamforming vector from a serving base station to a terminal, the method comprising: transmitting information identifying a first precoding matrix to the terminal; and transmitting information identifying a second precoding matrix to the terminal, wherein a beamforming vector is generated by linearly combining the first precoding matrix and the second precoding matrix, wherein the first precoding matrix is a precoding matrix that maximizes transmission power to the serving base station, and the second precoding matrix is a precoding matrix that minimizes interference power to a neighboring base station.

6. The method of claim 5, further comprising:
receiving the information on the second precoding matrix from the neighboring base station.

7. The method of claim 5, wherein the first precoding matrix is a precoding matrix that maximizes a norm of a product of a channel matrix between the terminal and the serving base station and each of a plurality of precoding matrices included in a code book.

8. The method of claim 5, wherein the information on the first precoding matrix and the information on the second precoding matrix are an index of the first precoding matrix and an index of the second precoding matrix in a code book including a plurality of precoding matrices, respectively.

9. The method of claim 1, wherein the second precoding matrix is a precoding matrix that minimizes a norm of a product of a channel matrix between the terminal and the neighboring base station and each of a plurality of precoding matrices included in a code book.

10. The method of claim 5, wherein the second precoding matrix is a precoding matrix that minimizes a norm of a product of a channel matrix between the terminal and the neighboring base station and each of a plurality of precoding matrices included in a code book.

11. A method to generate a beamforming vector by a terminal, the method comprising:
receiving an index of a first precoding matrix and an index of a second precoding matrix from a serving base station; and
generating a beamforming vector by combining the first precoding matrix and the second precoding matrix,
wherein the index of the first preceding matrix is "i" for maximizing $\|(W_i \cdot H_s)\|^2$,
the index of the second precoding matrix is "i" for minimizing $\|(W_i \cdot H_I)\|^2$,
the $H_s$ is a channel between the terminal and the serving base station,
the $H_I$ is a channel between the terminal and the neighboring base station, and
the $W_i$ is ith precoding matrix in a codebook including a plurality of precoding matrices.

12. A method to provide information for generating a beamforming vector from a serving base station to a terminal, the method comprising:
transmitting an index of a first precoding matrix to the terminal; and
transmitting an index of a second precoding matrix to the terminal,
wherein a beamforming vector is generated by combining the first precoding matrix and the second precoding matrix,
the index of the first preceding matrix is "i" for maximizing $\|(W_i \cdot H_s)\|^2$,
the index of the second precoding matrix is "i" for minimizing $\|(W_i \cdot H_I)\|^2$,
the $H_s$ is a channel between the terminal and the serving base station,
the $H_I$ is a channel between the terminal and the neighboring base station, and
the $W_i$ is $i^{th}$ precoding matrix in a codebook including a plurality of precoding matrices.

13. An apparatus for generating a beamforming vector by a terminal, the apparatus comprising: a beamforming vector generator which receives information identifying a first precoding matrix and information identifying a second precoding matrix from a serving base station, and generates a beamforming vector by linearly combining the first precoding matrix and the second precoding matrix; and a multiplier which multiplies the beamforming vector with an input signal to generate a transmission signal, wherein the first precoding matrix is a precoding matrix that maximizes transmission power to the serving base station and the second precoding matrix is a precoding matrix that minimizes interference to a neighboring base station.

14. An apparatus for generating a beamforming vector by a terminal, the apparatus comprising: a beamforming vector generator which receives an index of a first precoding matrix and an index of a second precoding matrix from a serving base station, and
generates a beamforming vector by linearly combining the first precoding matrix and the second precoding matrix; and a multiplier which multiplies the beamforming vector with an input signal to generate a transmission signal,
wherein the index of the first preceding matrix is "i" for maximizing $\|(W_i \cdot H_s)\|^2$,
the index of the second precoding matrix is "i" for minimizing $\|(W_i \cdot H_I)\|^2$,
the $H_s$ is a channel between the terminal and the serving base station,
the $H_I$ is a channel between the terminal and the neighboring base station, and
the $W_i$ is ith precoding matrix in a codebook including a plurality of precoding matrices.

* * * * *